United States Patent
Su et al.

(10) Patent No.: US 12,272,972 B2
(45) Date of Patent: Apr. 8, 2025

(54) LONG-TERM HIGH-POWER BATTERY SYSTEM WITH INTELLIGENT MANAGEMENT

(71) Applicants: Kuo-Hsin Su, New Taipei (TW); Ta-Yu Su, New Taipei (TW); Hsun-I Lee, New Taipei (TW)

(72) Inventors: Kuo-Hsin Su, New Taipei (TW); Ta-Yu Su, New Taipei (TW); Hsun-I Lee, New Taipei (TW)

(*) Notice: Subject to any disclaimer, the term of this patent is extended or adjusted under 35 U.S.C. 154(b) by 0 days.

(21) Appl. No.: 18/365,324

(22) Filed: Aug. 4, 2023

(65) Prior Publication Data
US 2025/0047109 A1 Feb. 6, 2025

(51) Int. Cl.
*H02J 7/00* (2006.01)
*F02N 11/08* (2006.01)

(52) U.S. Cl.
CPC ........ *H02J 7/0014* (2013.01); *F02N 11/0862* (2013.01); *F02N 11/087* (2013.01); *H02J 7/0031* (2013.01); *F02N 2011/0874* (2013.01)

(58) Field of Classification Search
CPC ... H02J 7/0014; H02J 7/0031; F02N 11/0862; F02N 11/087; F02N 7/0031; F02N 2011/0874

USPC ............................................... 307/10.6, 10.1
See application file for complete search history.

(56) References Cited

U.S. PATENT DOCUMENTS

| | | | | |
|---|---|---|---|---|
| 2003/0080621 A1* | 5/2003 | Kirk | ....................... | H02H 3/087 307/10.7 |
| 2014/0159670 A1* | 6/2014 | Lee | ....................... | B60L 3/0007 320/128 |
| 2020/0122583 A1* | 4/2020 | Harvey | ................. | H02J 7/0068 |
| 2020/0139818 A1* | 5/2020 | Fujiwara | ................... | B60L 3/04 |

\* cited by examiner

*Primary Examiner* — Michael R. Fin
(74) *Attorney, Agent, or Firm* — Rosenberg, Klein & Lee (57) ABSTRACT

A long-term high-power battery system with intelligent management includes a battery cell, and a battery management system including a secondary control system, a low-power switching element, a high-capacity relay and a battery cell voltage balancing system. When the secondary control system detects a high current load generated by the vehicle startup, the low-power switching element first interrupts the high load connected to the battery management system, and immediately starts the high-capacity relay, so that the large current passes through the high-capacity relay to provide the large current required by the vehicle load equipment. Through the battery cell voltage balancing system, the voltage difference between each battery cell is effectively controlled.

5 Claims, 7 Drawing Sheets

LONG-TERM HIGH-POWER BATTERY SYSTEM WITH INTELLIGENT MANAGEMENT

BACKGROUND OF THE INVENTION

1. Field of the Invention

The present invention relates to battery system technology and more particularly, to a long-term high-power battery system with intelligent management that effectively controls the path of a large current generated instantaneously when the vehicle is started, so as to protect battery cells and other circuits in the battery management system.

2. Description of the Related Art

Figure 3:
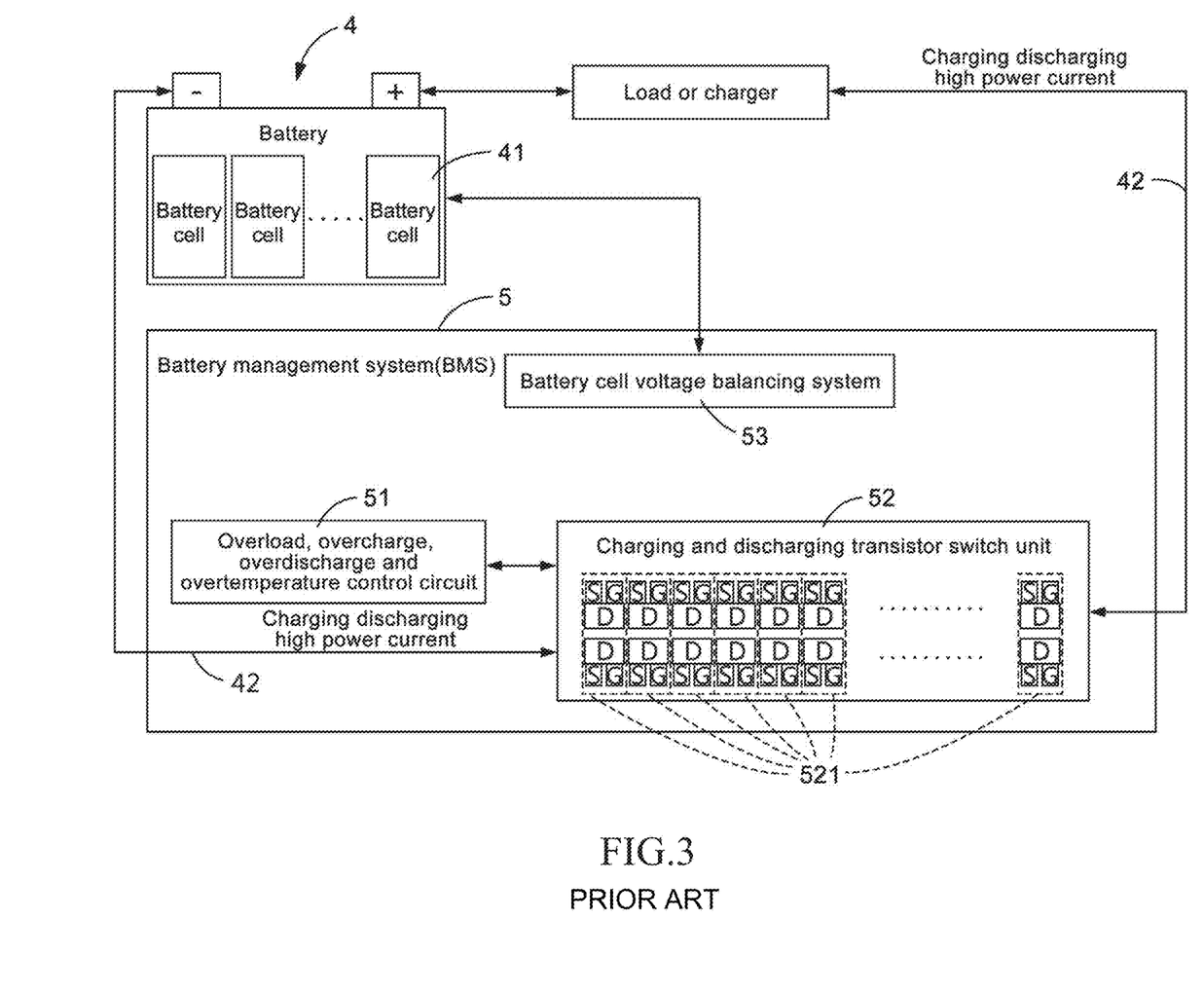
FIG. 3 is a conventional battery management system block diagram.

The design of the conventional vehicle battery, as shown in FIG. 3, is provided in the battery management system 5 with a charging and discharging transistor switch unit 52 for the passing of charging discharging high power current 42 to charge the battery cells 41 of the battery 4 or supply the starting motor current when starting the engine. The charging and discharging transistor switch unit 52 is composed of a plurality of charging and discharging transistor switches 521 connected in series. Because the vehicle will generate a very large current when the engine is started, but the current load of the charging and discharging transistor switches 521 used in the design of the conventional battery management system 5 of the battery 4 is quite small and the charging and discharging transistor switch unit 52 of the conventional battery management system 5 of the battery 4 is set on the circuit of the high power current 42, the conventional battery 4 is designed in the battery management system 5 to be able to carry the large current generated instantaneously when the vehicle is started. Therefore, it is necessary to use a large number of charging and discharging transistor switches 521. However, due to the high price of the charging and discharging transistor switches 521, the design of the conventional battery 4 using a large number of charging and discharging transistor switches 521 has greatly increased the cost and selling price.

Moreover, a large number of charging and discharging transistor switches 521 are used in the conventional battery 4. Because the battery 4 is installed in the high-temperature engine room, in addition to the poor heat dissipation function of the charging and discharging transistor switches 521, the temperature will also be generated when it is working, plus the high temperature in the engine room, the charging and discharging transistor switches 521 are easily damaged, and the replacement of the battery 4 will be needed.

Figure 4:
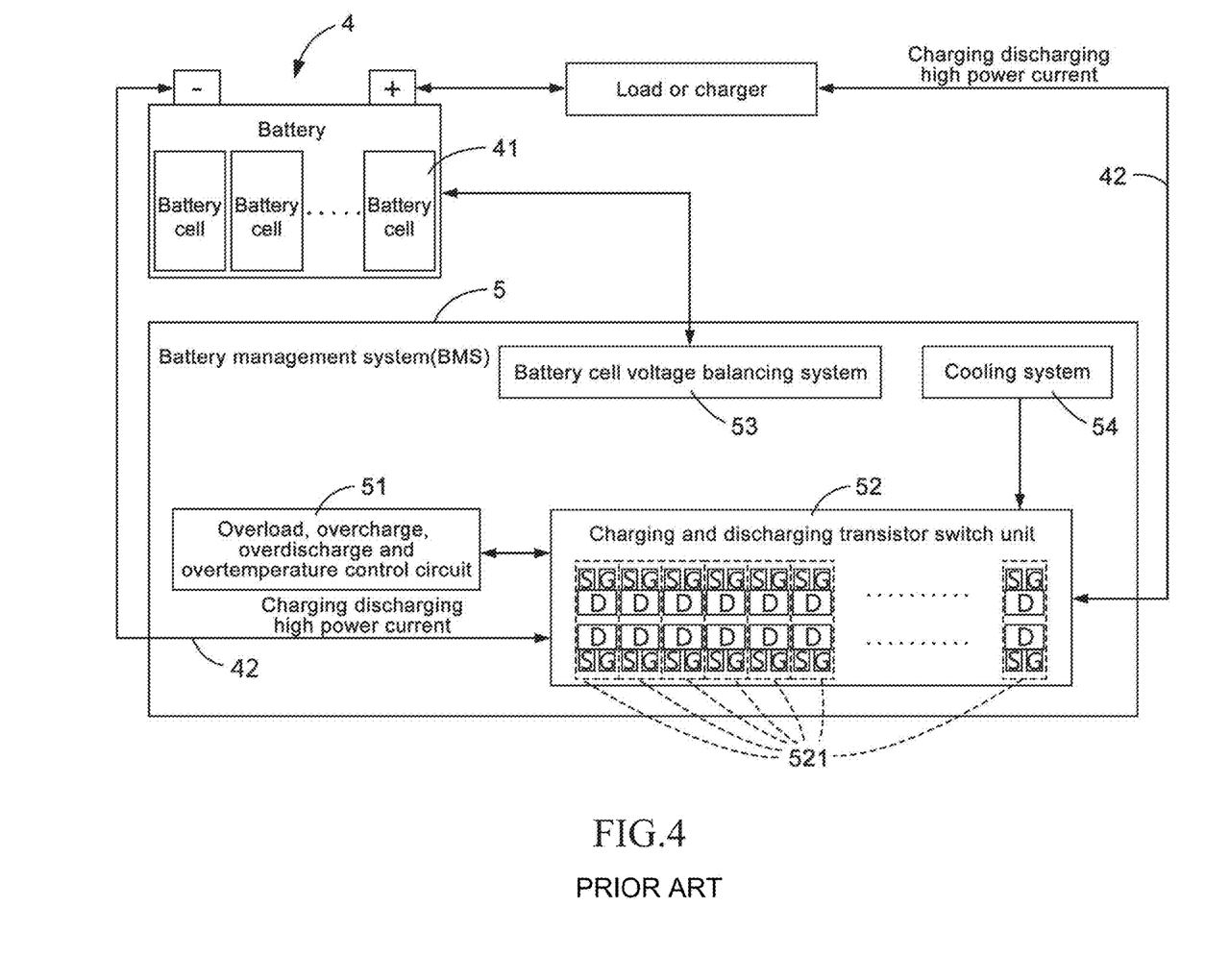
FIG. 4 is a block diagram of a conventional battery management system shown in FIG. 3 with a cooling system.

Although there is an overload, overcharge, overdischarge and overtemperature control circuit 51 in the conventional battery management system 5, it is arranged on the charging and discharging circuit of high power current 42, so the effect is limited. Moreover, when the vehicle is started, the instantaneously generated large current will pass through each charging and discharging transistor switch 521 of the charging and discharging transistor switch unit 52 instantaneously, and because the charging and discharging transistor switches 521 cannot carry the instantaneously large current, each charging and discharging transistor switch 521 will generate high temperature. The high temperature generated in this situation will cause the charging and discharging transistor switches 521 to fail and be damaged in the state of accumulating the instantaneous large current during multiple startups to generate high temperature. And this high temperature will also cause the circuit and contact solder of each charging and discharging transistor switch 521 to separate due to high temperature melting, or cause poor contact, which will cause the battery 4 to be unusable and shorten the life of the battery 4. There are companies install a cooling system 54 on the charging and discharging transistor switch unit 52. As shown in FIG. 4, although this method can reduce the temperature slightly, the effect is limited, and in addition to increasing the cost, it also increases the volume of the product.

Figure 5:
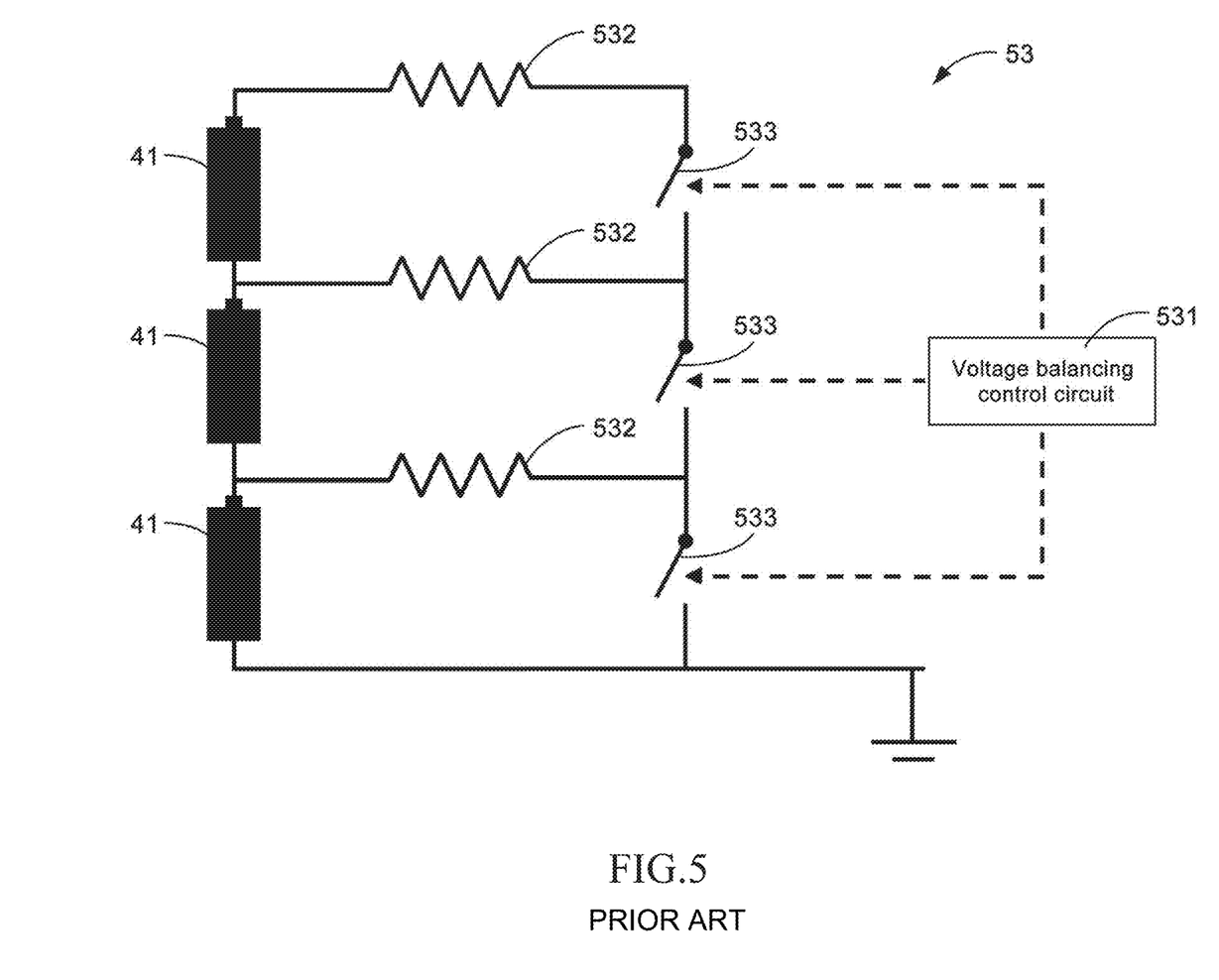
FIG. 5 is a conventional battery management system resistive battery cell voltage balancing system diagram.

In addition, the conventional battery 4 is provided with a battery cell voltage balancing system 53 in its battery management system 5, and the conventional battery cell voltage balancing system 53 includes two types, i.e., the resistive balancing circuit and the capacitive balancing circuit. The resistive balancing circuit is connected in series with each battery cell 41 of the battery 4 with a plurality of resistors 532 and transistor switches 533, and each transistor switch 533 is controlled by a voltage balancing control circuit 531. When the voltage difference of the battery cells 41 of the battery 4 is too high, the voltage balance control circuit 531 detects the voltage difference and immediately turns on the transistor switch 533 corresponding to the battery cell 41 of the battery to conduct the circuit, so as to use the set resistance 532 to release the excess power of the battery cell 41 to offset. However, this design wastes a lot of precious electric energy and generates a lot of heat, which indirectly affects the efficiency and service life of the battery (as shown in FIG. 5).

Figure 6:
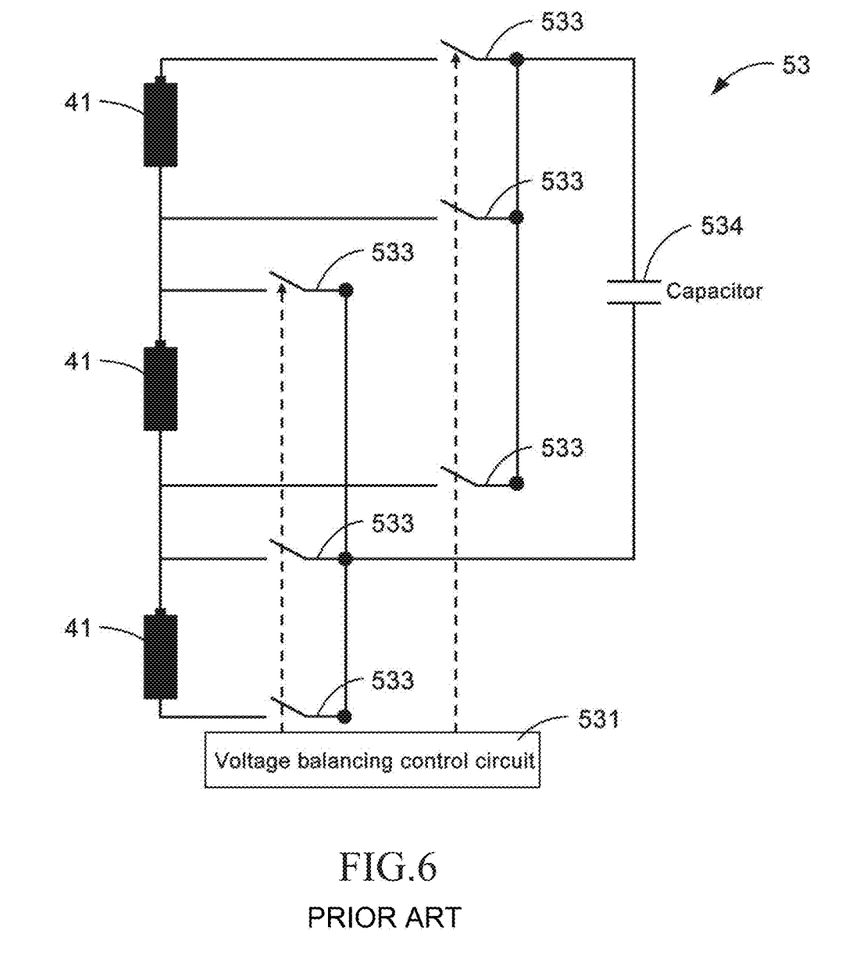
FIG. 6 is a conventional battery management system single capacitor battery cell voltage balance system diagram.
Figure 7:
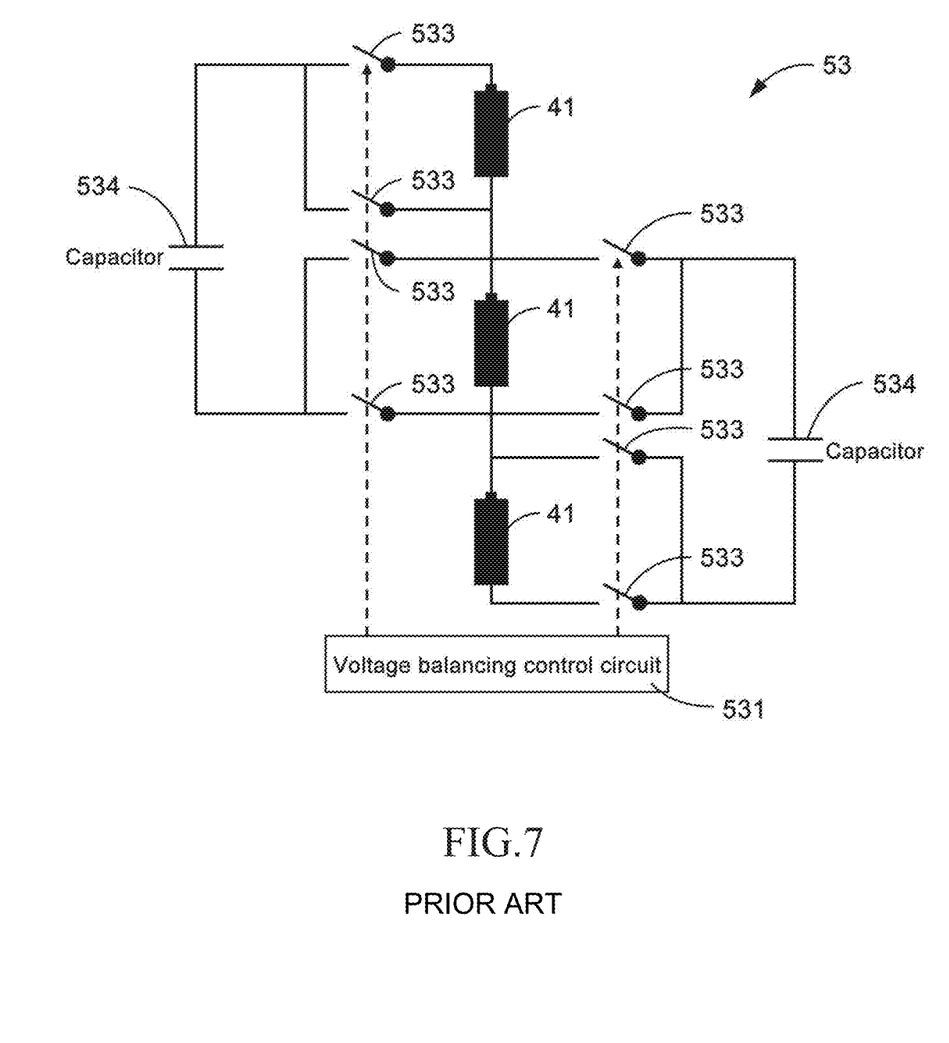
FIG. 7 is a conventional battery management system multi-capacitor battery cell voltage balance system diagram.

The other capacitive balancing circuit is divided into two types: single capacitor and multi-capacitor (as shown in FIG. 6 and FIG. 7), both of which are similarly connected with a plurality of transistor switches 533 connected in series with the battery cells 41 of the battery 4 so that the battery cells 41 and the capacitors 534 form a loop. When there is a high and low voltage difference between the electric voltage of the battery cells 41 of the battery 4, the set voltage balancing control circuit 531 will immediately turn on the transistor switch 533 connected to the high voltage battery cell 41 when detecting the voltage difference. After the excess power of the high voltage battery cell 41 is absorbed by the capacitor 534, the transistor switch 533 is used again to transfer the excess power absorbed by the capacitor 534 to the low voltage battery cell 41.

The relevant formula for capacitance is as follows:

$$C \text{ (capacitance)} = V \text{ (desired dropout voltage)} \times A \times t \text{ (amperes} \times \text{time)}$$

If a larger capacity is required, then it needs to use a capacitor with a larger capacity, but the capacitor with a large capacity is quite large in size and high in cost, and there is often a danger of explosion if the capacitor is used improperly.

SUMMARY OF THE INVENTION

The main object of the present invention is to use the secondary control system of the battery management system to detect the instantaneously generated high current load when the vehicle is started, then the low-power switching element\ first interrupts the high load connected to the battery management system, and immediately starts the high-capacity relay on the charging and discharging high-power current circuit, so that the high-capacity relay can pass through the high-capacity relay, so that all the high current generated at the moment of starting the vehicle passes through the high-capacity relay, providing the large current required by the vehicle load such as the engine starter motor at the moment of starting the engine, effectively controlling the path that generates a large current when the vehicle is started, and effectively remove many common design flaws in the previous technology charging and discharging transistor switch: insufficient current load, excessive use, excessive volume, high cost, additional cooling system required, difficult to dissipate heat in a difficult environment, easy to fail, easy to melt solder joints and shorten the circuit life.

The second object of the present invention is mainly to reduce the usage of a large amount of capacitors while avoiding the use of resistors to waste a large amount of precious electric energy. Through the battery cell voltage balancing system, the voltage difference between each battery cell is effectively controlled, and the electric energy of the battery cell is transferred to the high-efficiency charging and discharging micro-battery in real time. At the same time, the voltage balancing control circuit turns on the transistor switch connected to the low voltage battery cell, so as to instantly transfer the electric energy transferred to the high-efficiency charging and discharging micro-battery to the low voltage battery cell, so as to achieve the voltage balance of each battery cell, effectively transfer the overcharge energy without wasting it, have the effect of small size and low cost, protect the battery cell and greatly increase the battery life.

To achieve the above objects, the present invention provides a long-term high-power battery system with intelligent management, which comprises a battery with at least one battery cell installed therein, and a battery management system. The battery management system comprises a secondary control system, a low-power switching element, a high-capacity relay, and a battery cell voltage balancing system. The long-term high-power battery system of the present invention is equipped with a high-power current circuit for charging and discharging, and a circuit of low-power load current. The battery management system, the secondary control system, the low-power switching element and the battery cell voltage balancing system are all connected to the circuit of low-power load current, and the high-capacity relay that can carry a large current is set on the circuit of high-power current of charging and discharging, so as to divide the high-current and low-current circuits. The secondary control system comprises an overload, overcharge, overdischarge and overtemperature control circuit, a load detection and pre-charge control circuit, and an emergency start control circuit. If any battery cell of the battery is overloaded, overcharged, overdischarged or overheated, the high-capacity relay will be closed by the overload, overcharge, overdischarge and overtemperature control circuit to interrupt all current and the circuit of low-power load current to protect the battery cells of the battery. When the load detection and pre-charge control circuit in the secondary control system detects a high current load generated by the vehicle startup through the low-power switching element, the low-power switching element cuts off the high load connected to the battery management system first, and immediately activates the high-capacity relay set on the circuit of high-power current for charging and discharging through the load detection and pre-charge control circuit, so that large current can pass through the high-capacity relay to provide vehicle load such as engine starter motor with high current required when starting the engine, so as to protect low-power switching element, reduce volume, reduce failure probability and cost.

Preferably, the battery cell voltage balancing system comprises a voltage balancing control circuit and a high-efficiency charging and discharging micro-battery. The high-efficiency charging and discharging micro-battery is arranged in parallel with a plurality of transistor switches corresponding to each battery cell of the battery. When the generator of the vehicle charges the battery and the voltage difference between each battery cell of the battery is too high, the voltage balancing control circuit will instantly turn on the transistor switch connected to the high voltage battery cell, so as to immediately transfer the overcharge energy of the battery cell to the high-efficiency charging and discharging micro-battery, then the voltage balancing control circuit turns on the transistor switch connected to the lower voltage battery cell, so as to instantly transfer the electric energy transferred to the high-efficiency charging and discharging micro-battery to the low voltage battery cell, so as to achieve the voltage balance of each battery cell, and then protect the battery cells of the battery and greatly increase the life of the battery.

Preferably, the load detection and pre-charge control circuit can perform bidirectional pre-charging and recharging control on vehicle loads such as engine starter motor capacitors or generator. At the same time, the load detection and pre-charge control circuit not only detects the load of the battery cells of the battery, but also has a low-power load current circuit connected to the low-power switching element. When the vehicle is started, a large current load will be generated instantaneously. At this time, the load detection and pre-charge control circuit will detect the instantaneously generated high current load through the low-power switching element when the vehicle is started. The low-power switching element first interrupts the high load connected to the battery management system, and immediately starts the high-capacity relay through the load detection and pre-charge control circuit, so that all the high current generated at the moment of starting the vehicle passes through the high-capacity relay installed on the high-power current circuit of charging and discharging, providing the large current required by the vehicle load such as the engine starter motor at the moment of starting the engine and protecting the battery cells of the battery and the electronic parts in the battery management system from being damaged by instantaneous high current.

Preferably, the emergency start control circuit has the function of detecting the power of the battery cells of the battery. When the vehicle is parked for too long and the power of the battery cells of the battery is reduced at least enough to start the engine, the emergency start control circuit will interrupt the output of the battery to preserve the remaining power of the battery cells of the battery. When the vehicle is to be restarted, it is only necessary to turn on the forced switch located on the emergency start control circuit to forcibly turn on the power of the battery, so as to achieve the purpose of starting the engine and preventing the battery cells of the battery from being permanently damaged due to exhaustion of power.

DETAILED DESCRIPTION OF THE PREFERRED EMBODIMENT

Figure 1:
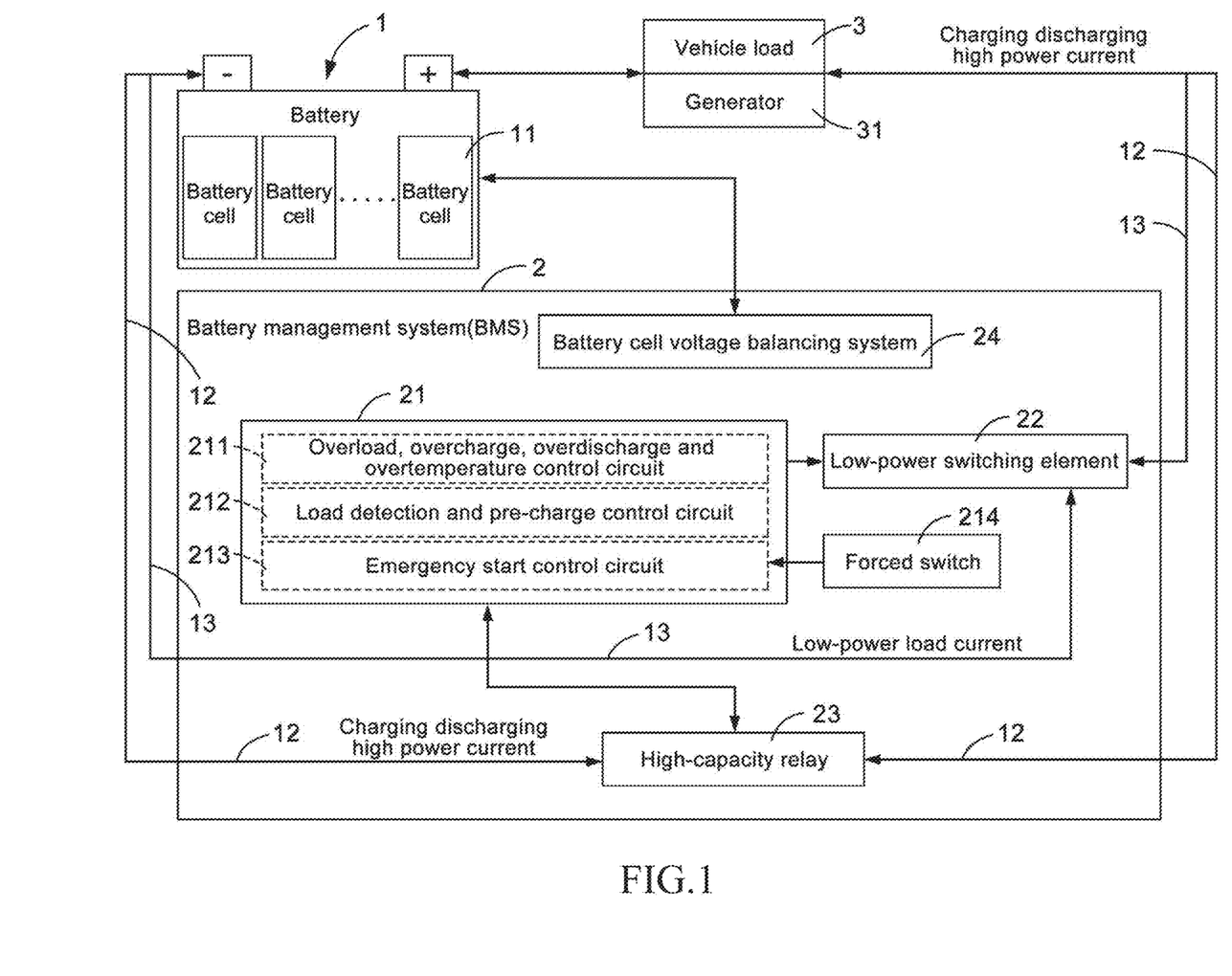
FIG. 1 is a system block diagram of one preferred embodiment of the present invention.
Figure 2:
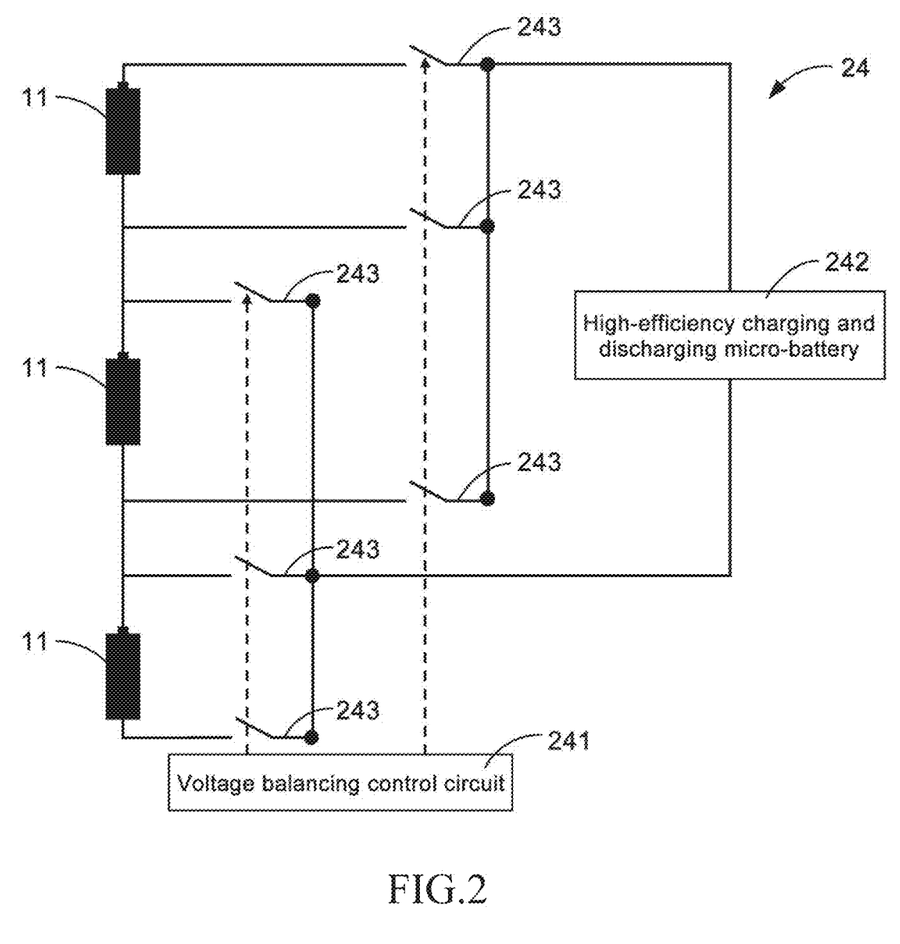
FIG. 2 is the battery cell voltage balancing system diagram of the present invention.

Please refer to FIG. 1, the present invention relates to a long-term high-power battery system with intelligent management, which comprises a battery 1 with at least one battery cell 11 installed therein, and a battery management system 2. The battery management system 2 comprises a secondary control system 21, a low-power switching element 22, a high-capacity relay 23, and a battery cell voltage balancing system 24. The long-term high-power battery system of the present invention is equipped with a circuit of charging discharging high power current 12 for charging and discharging, and a circuit of low-power load current 13. The battery management system 2, the secondary control system 21, the low-power switching element 22 and the battery cell voltage balancing system 24 are all connected to the circuit of low-power load current 13, and the high-capacity relay 23 that can carry a large current is set on the circuit of charging discharging high power current 12, so as to divide the high-current and low-current circuits. When the load detection and pre-charge control circuit 212 in the secondary control system 21 detects a high current load generated by the vehicle startup through the low-power switching element 22, the low-power switching element 22 cuts off the high load connected to the battery management system 2 first, and immediately activates the high-capacity relay 23 set on the circuit of charging discharging high power current 12 through the load detection and pre-charge control circuit 212, so that large current can pass through the high-capacity relay 23 to provide vehicle load 3 such as engine starter motor with high current required when starting the engine, so as to protect low-power switching element 22, reduce volume, reduce failure probability and cost. The battery cell voltage balancing system 24 comprises a voltage balancing control circuit 241 and a high-efficiency charging and discharging micro-battery 242. The high-efficiency charging and discharging micro-battery 242 is arranged in parallel with a plurality of transistor switches 243 corresponding to each battery cell 11 of the battery 1. When the generator 31 of the vehicle charges the battery 1 and the voltage difference between each battery cell 11 of the battery 1 is too high, the voltage balancing control circuit 241 will instantly turn on the transistor switch 243 connected to the high voltage battery cell 11, so as to immediately transfer the overcharge energy of the battery cell 11 to the high-efficiency charging and discharging micro-battery 242, then the voltage balancing control circuit 241 turns on the transistor switch 243 connected to the lower voltage battery cell 11, so as to instantly transfer the electric energy transferred to the high-efficiency charging and discharging micro-battery 242 to the low voltage battery cell 11, so as to achieve the voltage balance of each battery cell 11 (as shown in FIG. 2), and then protect the battery cells 11 of the battery 1 and greatly increase the life of the battery 1.

The secondary control system 21 comprises an overload, overcharge, overdischarge and overtemperature control circuit 211, a load detection and pre-charge control circuit 212, and an emergency start control circuit 213. If any battery cell 11 of the battery 1 is overloaded, overcharged, overdischarged or overheated, the high-capacity relay 23 will be closed by the overload, overcharge, overdischarge and overtemperature control circuit 211 to interrupt all current and the circuit of low-power load current 13 to protect the battery cells 11 of the battery 1. Normally, the load detection and pre-charge control circuit 212 detects whether the current load needs more power through the low-power switching element 22 to decide whether to start the high-capacity relay 23. The overload, overcharge, overdischarge and overtemperature control circuit 211 will immediately disconnect the low-power switching element 22 and the high-capacity relay 23 during overload, overcharge, overdischarge and overtemperature. The low-power switching element 22 is a bi-directional selectable transistor switch.

The load detection and pre-charge control circuit 212 can perform bidirectional pre-charging and recharging control on vehicle loads 3 such as engine starter motor capacitors or generator 31. At the same time, the load detection and pre-charge control circuit 212 not only detects the load of the battery cells 11 of the battery 1, but also has a low-power load current circuit connected to the low-power switching element 22. When the vehicle is started, a large current load will be generated instantaneously. At this time, the load detection and pre-charge control circuit 212 will detect the instantaneously generated high current load through the low-power switching element 22 when the vehicle is started. The low-power switching element 22 first interrupts the high load connected to the battery management system 2, and immediately starts the high-capacity relay 23 through the load detection and pre-charge control circuit 212, so that all the high current generated at the moment of starting the vehicle passes through the high-capacity relay 23 installed on the circuit of charging discharging high power current 12, providing the large current required by the vehicle load 3 such as the engine starter motor at the moment of starting the engine and protecting the battery cells 11 of the battery 1 and the electronic parts in the battery management system 2 from being damaged by instantaneous high current.

The emergency start control circuit 213 has the function of detecting the power of the battery cells 11 of the battery 1. When the vehicle is parked for too long and the power of the battery cells 11 of the battery 1 is reduced at least enough to start the engine, the emergency start control circuit 213 will interrupt the output of the battery 1 to preserve the remaining power of the battery cells 11 of the battery 1. When the vehicle is to be restarted, it is only necessary to turn on the forced switch 214 located on the emergency start control circuit 213 to forcibly turn on the power of the battery 1, so as to achieve the purpose of starting the engine and preventing the battery cells 11 of the battery 1 from being permanently damaged due to exhaustion of power.

To sum up, the present invention provides a path for effectively controlling the momentary high current generation when the vehicle is started, and quickly transfers the overcharged high voltage battery cell to the low voltage battery cell to generate a voltage balance for each battery cell, so as to protect the battery cell, greatly increase the battery life, and greatly reduce the failure rate and manufacturing costs.

What the invention claimed is:

1. A long-term high-power battery system with intelligent management, comprising a battery and a battery management system, a high-power current circuit for charging and discharging and a low-power load current circuit, said battery comprising at least one battery cell therein, said battery management system comprising a secondary control system, a low-power switching element, a high-capacity relay and a battery cell voltage balancing system, said battery management system and said low-power switching element being connected to said low-power load current circuit, said high-capacity relay being capable of carrying a large current and being set on said high-power current circuit to divide the high-current and low-current circuits, wherein when said secondary control system detects the high current load generated by the vehicle startup, said low-power switching element first interrupts the high load connected to said battery management system, and immediately activates said high-capacity relay set on said high-power current circuit through said secondary control system, so that the large current is allowed to pass through said high-capacity relay to provide the high current required by the vehicle load equipment such as the engine starter motor when starting the engine, so as to protect said low-power switching element.

2. The long-term high-power battery system with intelligent management as claimed in claim 1, wherein said battery cell voltage balancing system comprises a voltage balancing control circuit and a high-efficiency charging and discharging micro-battery, said high-efficiency charging and discharging micro-battery being arranged in parallel with a plurality of transistor switches corresponding to each said battery cell of said battery, so that when the generator of the vehicle charges said battery and the voltage difference between each said battery cell of said battery is too high, said voltage balancing control circuit instantly turns on the respective said transistor switch that is connected to the said battery cell that is at a high voltage, so as to immediately transfer the overcharge energy of the said battery cell that is at a high voltage to said high-efficiency charging and discharging micro-battery, then said voltage balancing control circuit turns on the said transistor switch that is connected to the said battery cell that is at a lower voltage, so as to instantly transfer the electric energy transferred to said high-efficiency charging and discharging micro-battery to the said battery cell that is at a lower voltage, so as to achieve the voltage balance of each said battery cell.

3. The long-term high-power battery system with intelligent management as claimed in claim 1, wherein said secondary control system, said low-power switching element and said battery cell voltage balancing system are connected to said low-power load current circuit; said secondary control system comprises an overload, overcharge, overdischarge and overtemperature control circuit, a load detection and pre-charge control circuit and an emergency start control circuit; said overload, overcharge, overdischarge and overtemperature control circuit being used to turn off said high-capacity relay to interrupt all current and low power load current to protect said battery cells when said battery cells are overloaded, overcharged, overdischarged or overtemperature.

4. The long-term high-power battery system with intelligent management as claimed in claim 3, wherein said load detection and pre-charge control circuit is capable of performing bidirectional pre-charging and recharging control on vehicle loads such as engine starter motor capacitors or generator and is capable of detecting the load of said battery cells of said battery; when the vehicle is started, a large current load is generated instantaneously, at this time, said load detection and pre-charge control circuit detects the instantaneously generated high current load through, and said low-power switching element first interrupts the high load connected to said battery management system, and immediately starts said high-capacity relay through said load detection and pre-charge control circuit, so that all the high current generated at the moment of starting the vehicle passes through said high-capacity relay installed on said high-power current circuit.

5. The long-term high-power battery system with intelligent management as claimed in claim 3, wherein said emergency start control circuit has the function of detecting the power of said battery cells of said battery, so that when the vehicle is parked for too long and the power of said battery cells of said battery is reduced at least enough to start the engine, said emergency start control circuit interrupts the output of said battery to preserve the remaining power of said battery cells of said battery, and when the vehicle is to be restarted, turns on a forced switch located on said emergency start control circuit to forcibly turn on the power of said battery, so as to achieve the purpose of starting the engine and preventing said battery cells of said battery from being permanently damaged due to exhaustion of power.

* * * * *